United States Patent [19]

Fluhr

[11] 4,096,447
[45] Jun. 20, 1978

[54] UNSTABLE RESONATOR LASER SYSTEM

[75] Inventor: Frederick R. Fluhr, Oxon Hill, Md.

[73] Assignee: The United States of America as represented by the Secretary of the Navy, Washington, D.C.

[21] Appl. No.: 744,476

[22] Filed: Nov. 24, 1976

[51] Int. Cl.² ............................................. H01S 3/081
[52] U.S. Cl. ................................. 331/94.5 C; 350/299
[58] Field of Search ..................... 331/94.5 C, 94.5 D; 350/294, 299, 300

[56] References Cited

U.S. PATENT DOCUMENTS 3,942,127  3/1976  Fluhr et al. ..................... 331/94.5 C

OTHER PUBLICATIONS

Chodzko et al., Annular Converging Wave Cavity, Applied Optics, vol. 15, No. 9, (Sep. 1976), pp. 2137-2144.

Primary Examiner—William L. Sikes
Attorney, Agent, or Firm—R. S. Sciascia; Philip Schneider; Melvin L. Crane

[57] ABSTRACT

Optical radiation reflective surfaces for use in an unstable resonator laser system in which the output beam of the system does not contain an aperture in the middle of the beam thereby avoiding the requirement of a collimation lens system to obtain a beam of minimum divergence. The system provides an output beam which does not have a central hole.

3 Claims, 2 Drawing Figures

UNSTABLE RESONATOR LASER SYSTEM

BACKGROUND OF THE INVENTION

This invention relates to unstable optical resonators for laser applications and more particularly to reflective surfaces in an unstable resonator system.

An unstable optical resonator is one which has divergent focusing properties such that the optical modes fall in the unstable or high loss region of the resonator mode chart. Unstable optical resonators have been described in the following published articles: (1) "Unstable Optical Resonators for Laser Applications" by A. E. Siegman, *Proceedings of the IEEE, March* 1965, pp 277–287; (2) "Modes in Unstable Optical Resonators and Lens Waveguide" by Anthony E. Siegman and Raymond Arrathoon, IEEE Journal of Quantum Electronics, Vol. QE-3, #4, April 1967, pp 156–163; (3) "Properties of An Unstable Confocal Resonator $CO_2$ Laser System", by William F. Krupke and Walter R. Sooy, *IEEE Journal of Quantum Electronics,* Vol. QE-5, No. 12, December 1969, pp 575–586.

Unstable resonators have a large diffraction loss but are useful because they have large mode volumes in very short resonators, the unstable configuration is readily adapted to adjustable-diffraction output coupling and they have substantial discrimination against higher-order transverse modes.

SUMMARY OF THE INVENTION

This invention makes use of specially designed reflective surfaces for use in an unstable optical resonator. One of the reflective surfaces is an aspheric concave mirror with an axially aligned aperture therein through which the output radiation is reflected so that the output beam does not have a hole in the middle. The other reflective surface is an aspheric convex mirror surface centered within a flat mirror surface which reflects the radiation through the laser medium and out through the output aperture in the other reflective means.

DETAILED DESCRIPTION

Figure 1:
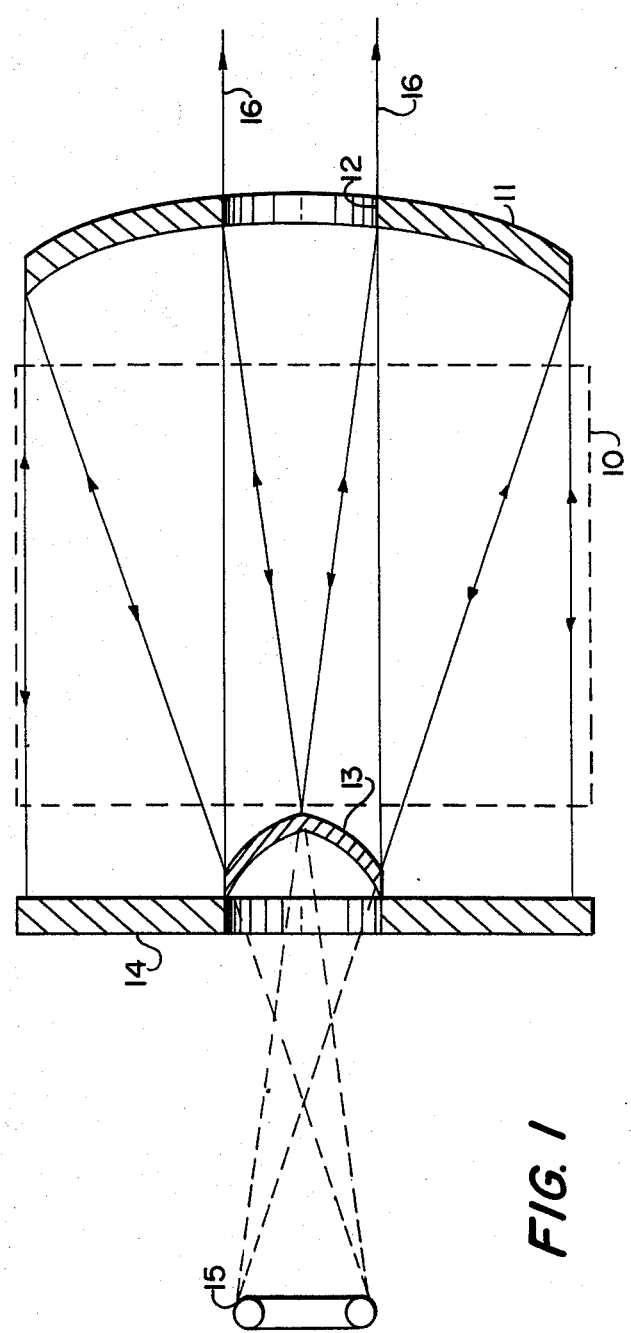
FIG. 1 illustrates a positive-branch, inside-out, unstable resonator laser system.

FIG. 1 illustrates a laser system, in accordance with the invention, having an active laser medium 10 such as $CO_2$—$N_2$—He or other gaseous media as well as solid-state types such as ruby. The laser medium has an annular, aspheric, concave primary mirror 11 at one end with a centrally located aperture 12 therein and a smaller-diameter, circular in circumference, aspheric, convex secondary mirror 13 at the opposite end of the laser medium annularly encircled by flat feedback mirror 14 having a central aperture. Each of the mirrors 11 and 13 are shown in cross section with the aperture 12 in mirror 11, and the mirror 13 centered on the axis of the laser medium. Each of the mirrors 11 and 13 are of the type described in U.S. Pat. No. 3,942,127 with their focus on a confocal focus ring 15 rather than at a point. The solid lines with arrow points represent the principle ray paths through the active laser medium and the output beam 16, with the dotted lines extending to the confocal focus ring 15 on the outside of the cavity.

The flat feedback mirror encircling the, aspheric, convex, secondary mirror the convex secondary mirror and the annular, aspheric concave mirrow with the laser medium therein form the active laser cavity with the power output through the aperture within the annular, aspheric concave mirror. Since the output is centered on the axis of the cavity there is no hole in the output beam. As shown in the drawing, the diameter of the secondary convex mirror is much smaller than that of the primary concave mirror. Thus, the flat mirror encircling the aspheric concave secondary mirror provides the resonator feedback and the power is extracted through the aperture in the annular aspheric primary concave mirror by reflection from the secondary aspheric convex mirror.

The design of the convex and concave mirrors and the relationship of one mirror to the other in the laser cavity are such that their focal rings are confocal with the focal ring outside of the cavity.

In operation, the laser medium is excited in the well-known manner and the mirrored surfaces reflect the light rays back and forth between the three mirrored surfaces until the rays are reflected from the concave mirror onto the convex mirror within the flat mirror. The convex mirror directs the rays out through the output aperture in the concave mirror. The output beam will be centered on the optical axis of the system and the rays will be coherent.

Figure 2:
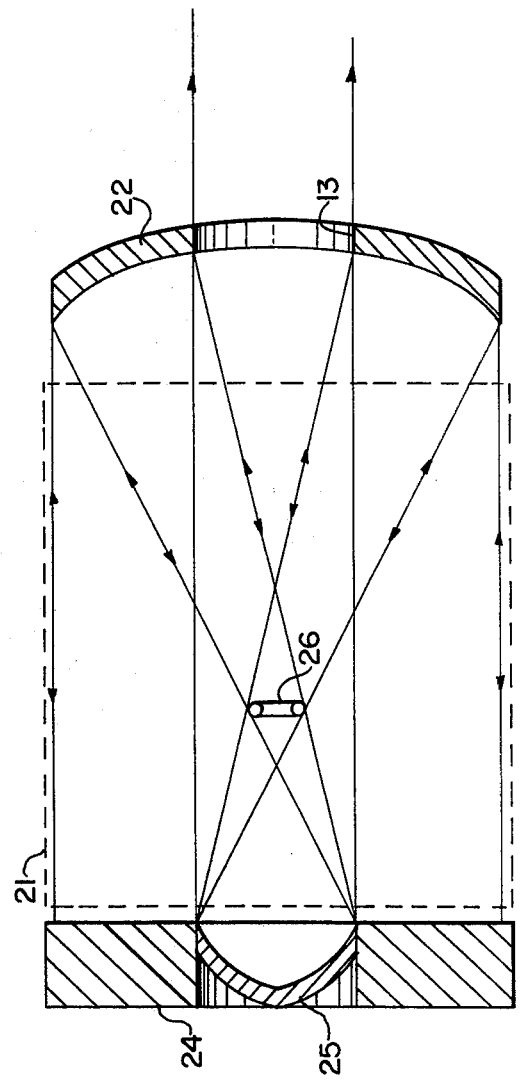
FIG. 2 illustrates a negative-branch, inside-out, unstable resonator laser system.

FIG. 2 illustrates a negative-branch, inside-out, unstable resonator laser system. This system includes an active laser medium 21 such as used in the embodiment of FIG. 1 with an annular, aspheric, concave primary mirror 22 having an aperture 23 in the center similar to that shown in FIG. 1. The concave mirror 22 is located at one end of the laser medium. A flat mirror 24 surrounds a circular in circumference, aspheric, concave secondary mirror 25 coaxial therewith, the combination being positioned at the opposite end of the laser medium coaxial with the optical axis of the system. The concave mirrors at each end of the laser medium have a ring focus 26 within the cavity centered on the axis thereof and are confocal. These mirrors are also described in U.S. Pat. No. 3,942,127.

The operation of the laser system shown in FIG. 2 is the same as that for the system shown in FIG. 1, except that the light reflected back and forth in the cavity is focused onto a focal ring within the cavity area. The output radiation is directed through the aperture in the primary concave mirror by the concave secondary mirror.

The mirrors are figures of rotation with the center of the radius of rotation being off the center line in the cross-sectional view.

The upper half of the mirror surface as shown in cross section is spherical with its center of radius off-set from the optical center line and rotationally symetric about the optical center line, thus creating a focal ring halfway between the locus of center of radius of curvature.

The basic design equations for positioning the concave and convex mirrors are the same, except for a coordinate rotation, as for the standard, unstable, negative-branch resonator system as set forth in the published articles included above. The use of the concave and convex mirrors with a flat mirror providing the resonator feedback eliminates the hole in the center of the output as found in the output beams of prior-art unstable resonators. Also, the configuration maintains an efficient power extraction over large, active, laser media volumes.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United Stages is:

1. An unstable resonator laser system which comprises:
   an active laser medium;
   an annular, aspheric, primary concave mirror opposite one end of said active laser medium and positioned with its focal ring centered on the axis of said active laser medium, said mirror being formed with a circular aperture through the center thereof;
   an annular, flat feedback mirror positioned on the opposite side of said active laser medium in axial alignment with said primary concave mirror and perpendicular to the axis; and
   an, aspheric secondary mirror encircled by said flat mirror so that it is concentric therewith and acting to reflect light to said primary concave mirror, said secondary mirror having its focal ring centered on the axis of said active laser medium,
   whereby said flat feedback mirror provides the resonant feedback for said system and said secondary mirror reflects the output through the aperture in the annular, aspheric, primary concave mirror.

2. An unstable resonator laser system as claimed in claim 1, wherein:
   said secondary mirror is of a convex type.

3. An unstable resonator laser system as claimed in claim 1, wherein:
   said secondary mirror is of a concave type.

* * * * *